Feb. 5, 1963
P. F. CUVIER
3,076,395
APPARATUS FOR PRODUCING A PHOTOGRAPH
HAVING A RELIEF EFFECT
Filed June 7, 1960
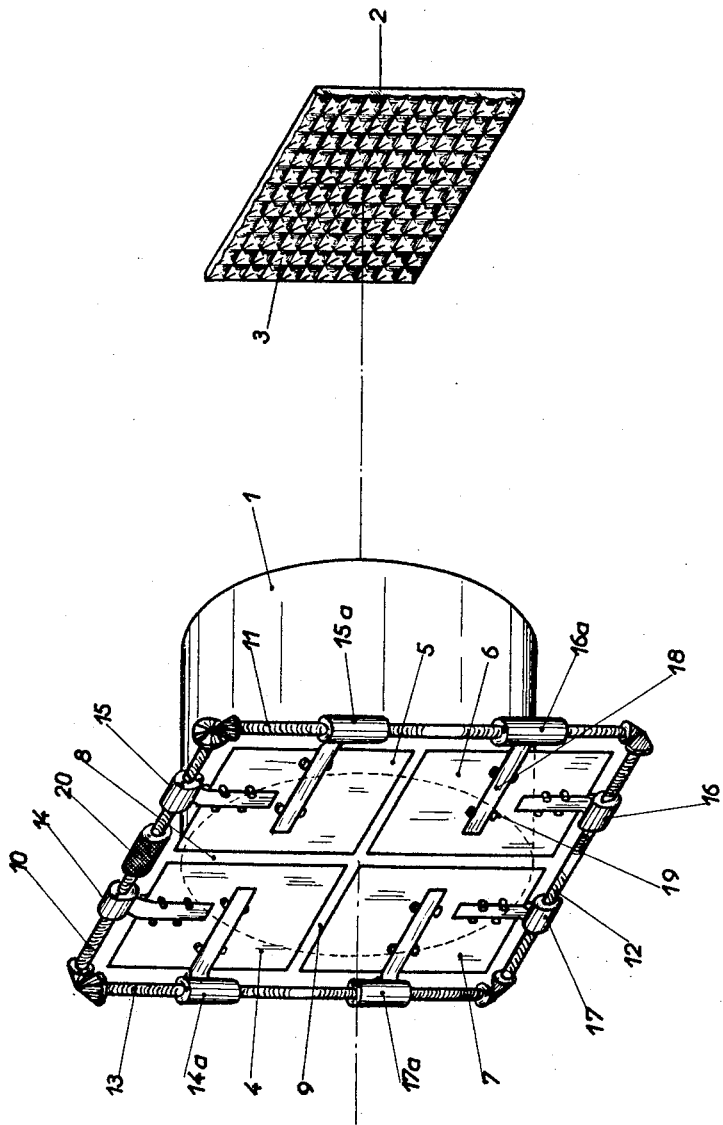
Inventor
Pierre Frederic Cuvier
by
Michael S. Striker
Attorney United States Patent Office 3,076,395
Patented Feb. 5, 1963

3,076,395
APPARATUS FOR PRODUCING A PHOTOGRAPH HAVING A RELIEF EFFECT
Pierre Frédéric Cuvier, 5, Rue Auguste Comte, Paris, France
Filed June 7, 1960, Ser. No. 34,482
Claims priority, application France June 9, 1959
1 Claim. (Cl. 95—18)

This invention relates to improvements in a method of and apparatus for producing a photograph having a relief effect when viewed through a screen of cylindrical lens elements.

I have previously proposed a process for producing a photograph having a relief effect which process comprises photographing an object on to a sensitised plate placed behind a screen composed of a number of parallel cylindrical lens elements disposed side-by-side through a single object lens having a useful or effective aperture greater than the average interpupillary distance and which is combined with a diaphragm having a slit extending in the direction normal to the axes of the lens elements.

It is an object of the present invention to provide an improved method of and apparatus for producing a photograph having a relief effect which can be viewed in four positions and whereby a greater angle of correct vision is obtained than with hitherto proposed methods and apparatus.

According to one aspect of the present invention, a method of producing a photograph having a relief effect comprises projecting an image of the object to be photographed on to a sensitised plate through a screen composed of lens elements shaped to have two radii of curvature in orthogonal plases.

The invention also extends to photographs produced by the method of the immediately preceding paragraph.

According to another aspect of the present invention, apparatus for producing a photograph having a relief effect comprises a screen composed of lens elements shaped to have two radii of curvature in orthogonal planes.

One embodiment of the invention will now be described by way of example, reference being made to the accompanying drawing which is a diagrammatic perspective view, not to scale, of an apparatus according to the invention for taking stereoscopic photographs.

In this embodiment, an object lens 1 of relatively large dimensions is disposed in front of an assembly composed of a sensitised plate 2 attached to a screen composed of a network of lens elements 3 having cylindrical surfaces and which are shown enlarged relative to the sensitised plate for the purposes of illustration. The lens elements 3 are shaped to occupy the volume common to two sets of similar cylindrical lens elements, the elements of each set being disposed side-by-side with their axes parallel to those of the other elements in the set and the axes of the elements in one set being normal to the axes of the elements in the other set. The elements 3 thus have two radii of curvature in orthogonal planes and have two sets of focal lines mutually at right-angles to each other, one set being vertical in this example and the other set being horizontal. In front of the object lens 1, between the lens 1 and the object to be photographed, there is placed a diaphragm composed of four elements 4, 5, 6 and 7 defining a vertical slit 8 parallel to one axis of the lens elements 3 and a horizontal slit 9 parallel to the other axis of the lens elements 3. The slits 8 and 9 extend parallel to two mutually perpendicular axes of the object lens 1 and centre on the optical axis of the latter. The vertical slit 8 corresponds to the horizontal axes of the elements 3 and the horizontal slit corresponds to the vertical axes of the lens elements 3. The aperture of the object lens 1, that is to say the diameter of the emergent beam of light, has a diameter greater than or at least equal to the average interpupillary distance, i.e. 65 mm., and the slits 8 and 9 are of a length sufficient to ensure that the light coming from the object to be photographed can pass through the entire diametral zones of the lens aperture.

The curvatures of the lens elements 3 are determined in relation to the number of such elements per mm., the thickness of the screen and the refractive index of the material used, so that that angle of the field of each lens element 3 takes in as far as possible the image of the slits 8 and 9 on the emergent beam.

Each part of the diametral zones of the object lens 1 which the light can reach through the slits 8 and 9 functions as a small object lens, and for any given point of the object there are thus an infinite number of images photographed on the sensitised plate 2 behind each of the lens elements 3.

After a photograph has been taken, the exposed sensitised plate 2 is separated from the screen composed of the lens elements 3, developed and then copied as a positive. Finally, for viewing, the positive is placed behind a screen similar to that composed of the lens elements 3 used for taking the photograph and similarly arranged. When the photograph is viewed through the screen, the stereoscopic picture which can be seen on account of the fact that each eye sees different portions of the picture, has a better continuity than stereoscopic photographs obtained by known processes.

The relief effect can be seen in four positions of the photograph, in view of the fact that the parts of the image are formed by separate points of the horizontal diameter and of the vertical diameter of the object lens 1, thus allowing a much greater angle of correct vision.

On the other hand the elemental images are formed by square surfaces, the number of which per mm. corresponds to the linear density of the lens elements used. For example, for a linear density of 5 lenticular elements per mm., there is obtained a corresponding line density of the image equal to 2,500 per square cm., which makes possible a reproduction by process engraving without the use of any special half-tone screen.

The slits 8 and 9 increase the depth of field of the object lens 1 to an extent which is inversely proportional to their width. It is, therefore, advantageous for the operator to be able to vary the said width. For this purpose the diaphragm elements 4, 5, 6 and 7 are movable vertically and horizontally. The drawing shows by way of example a device by which the diaphragm elements can be moved so that the width of the slit 8 is always equal to the width of the slit 9. Four screw-threaded members 10, 11, 12 and 13 are arranged as the sides of a rectangle or square surrounding the diaphragm elements 4, 5, 6 and 7 and generally parallel to the sides thereof. The threaded members are engaged by nuts 14, 14a, 15, 15a, 16, 16a, 17, 17a, each of which is provided with a strip such as as 18 slidable between projections 19 secured to the diaphragm elements. A milled sleeve 20 fitted on the member 10 can be operated by an operator to rotate the member 10 and drive the other members 11, 12 and 13 through the intermediary of bevel gears. As the nuts have threads of opposite sense from one diaphragm element to the other, if the sleeve 20 is operated the different screw-threaded members 10, 11, 12 and 13 will turn synchronously so that the diaphragm elements can be drawn closer together or moved apart, thus reducing or increasing accordingly and simultaneously the width of each of the slits 8 and 9.

The screen composed of the lens elements 3 can also be used with a device for taking photographs, said device having four objective lenses arranged in the form of a cross.

What I claim is:

Apparatus for producing a photograph having a relief effect comprising, in combination, a screen composed of lens elements shaped to have two radii of curvature in orthogonal planes and adapted to have a sensitized plate disposed on one side thereof; an object lens disposed on the other side of said screen and having an effective aperture of a diameter at least equal to the average interpupillary distance; a diaphragm disposed on the side of the object lens remote from said screen and formed by four diaphragm elements arranged in one plane to define between themselves two mutually perpendicular slots extending parallel to the respective generatrices of said lens elements; and means for displacing said diaphragm elements in said plane toward and away from each other to vary the widths of said slots and comprising four threaded members arranged along sides of a rectangle surrounding the diaphragm elements, two nuts engaging each threaded member and respectively operatively connected to said diaphragm elements, bevel gear means operatively connected to said threaded members for transmitting the drive from one threaded member to the threaded member adjacent thereto, and means for rotating one of the threaded members so as to simultaneously displace all said nuts to vary the width of said slots.

References Cited in the file of this patent

UNITED STATES PATENTS

| | | | |
|---|---|---|---|
| 1,935,471 | Kanolt | Nov. 14, | 1933 |
| 2,063,985 | Coffey | Dec. 15, | 1936 |
| 2,174,003 | Ives | Sept. 26, | 1939 |
| 2,185,221 | Nakken | Jan. 2, | 1940 |
| 2,622,472 | Bonnet | Dec. 23, | 1952 |
| 2,724,312 | Gruetzner | Nov. 22, | 1955 |